United States Patent
Gordon

[11] 3,975,584
[45] Aug. 17, 1976

[54] DITHER THRESHOLD GENERATORS

[75] Inventor: Pat LeMar Gordon, Matawan, N.J.

[73] Assignee: Bell Telephone Laboratories, Incorporated, Murray Hill, N.J.

[22] Filed: Sept. 22, 1975

[21] Appl. No.: 615,770

[52] U.S. Cl.............................. 178/6; 178/DIG. 3
[51] Int. Cl.²........................................ H04N 7/12
[58] Field of Search.................... 178/6, 6.8, DIG. 3

[56] References Cited
UNITED STATES PATENTS

3,739,082  6/1973  Lippel................................. 178/6
3,925,609  12/1975  Ninke............................. 178/7.3 D

*Primary Examiner*—Howard W. Britton
*Attorney, Agent, or Firm*—Ronald D. Slusky

[57] ABSTRACT

In a dithered display system, the two highest-order dither threshold bits are each generated exclusively in response to the least-significant row and column address counter bits and the third- and fourth-highest-order dither threshold bits are each generated exclusively in response to the second-least-significant row and column address counter bits, and so forth.

24 Claims, 7 Drawing Figures

COLUMNS

|  | 0 | 1 | 2 | 3 | 4 | 5 | 6 | 7 | - - - - - - - - - - - | 61 | 62 | 63 |
|---|---|---|---|---|---|---|---|---|---|---|---|---|
| 0 | 60 / 0 | 50 / 128 | 48 / 32 | 43 / 160 | 41 / 0 | 69 / 128 | 85 / 32 | 72 / 160 | | 41 / 128 | 78 / 32 | 79 / 160 |
| 1 | 53 / 192 | 65 / 64 | 69 / 224 | 72 / 96 | 55 / 192 | 79 / 64 | 62 / 224 | 74 / 96 | | 60 / 64 | 81 / 224 | 83 / 96 |
| 2 | 69 / 48 | 65 / 176 | 62 / 16 | 78 / 144 | 81 / 48 | 76 / 176 | 62 / 16 | 81 / 144 | | 114 / 176 | 111 / 16 | 121 / 144 |
| 3 | 32 / 240 | 81 / 112 | 58 / 208 | 86 / 80 | 69 / 240 | 102 / 112 | 86 / 208 | 117 / 80 | | 142 / 112 | 143 / 208 | 163 / 80 |
| 4 | 78 / 0 | 81 / 128 | 85 / 32 | 100 / 160 | 130 / 0 | 157 / 128 | 142 / 32 | 170 / 160 | | 110 / 128 | 272 / 32 | 218 / 160 |
| 5 | 88 / 192 | 123 / 64 | 142 / 224 | 182 / 96 | 157 / 192 | 196 / 64 | 192 / 224 | 211 / 96 | | 204 / 64 | 206 / 224 | 225 / 96 |
| 6 | 159 / 48 | 183 / 176 | 178 / 16 | 180 / 144 | 211 / 48 | 206 / 176 | 218 / 16 | 232 / 144 | | 234 / 176 | 246 / 16 | 218 / 144 |
| 7 | 156 / 240 | 190 / 112 | 183 / 208 | 225 / 80 | 209 / 240 | 225 / 112 | 234 / 208 | 225 / 80 | | 248 / 112 | 234 / 208 | 230 / 80 |
| ⋮ | | | | | | | | | | | | |
| 61 | 164 / 192 | 185 / 64 | 152 / 224 | 176 / 96 | 173 / 192 | 197 / 64 | 190 / 224 | 192 / 96 | | 196 / 64 | 225 / 224 | 220 / 96 |
| 62 | 119 / 48 | 105 / 176 | 105 / 16 | 128 / 144 | 137 / 48 | 157 / 176 | 161 / 16 | 166 / 144 | | 204 / 176 | 204 / 16 | 199 / 144 |
| 63 | 86 / 240 | 97 / 112 | 114 / 208 | 126 / 80 | 121 / 240 | 122 / 112 | 130 / 208 | 149 / 80 | | 183 / 112 | 182 / 208 | 215 / 80 |

ROWS

FIG. 3

COLUMNS

| | 0 | 1 | 2 | 3 | 4 | 5 | 6 | 7 | --- | 61 | 62 | 63 |
|---|---|---|---|---|---|---|---|---|---|---|---|---|
| 0 | 1 | 0 | 1 | 0 | 1 | 0 | 1 | 0 | | 0 | 1 | 0 |
| 1 | 0 | 1 | 0 | 0 | 0 | 1 | 0 | 0 | | 0 | 0 | 0 |
| 2 | 1 | 0 | 1 | 0 | 1 | 0 | 1 | 0 | | 0 | 1 | 0 |
| 3 | 0 | 0 | 0 | 1 | 0 | 0 | 0 | 1 | | 1 | 0 | 1 |
| 4 | 1 | 0 | 1 | 0 | 1 | 1 | 1 | 1 | | 0 | 1 | 1 |
| 5 | 0 | 1 | 0 | 1 | 0 | 1 | 0 | 1 | | 1 | 0 | 1 |
| 6 | 1 | 1 | 1 | 1 | 1 | 1 | 1 | 1 | | 1 | 1 | 1 |
| 7 | 0 | 1 | 0 | 1 | 0 | 1 | 1 | 1 | | 1 | 1 | 1 |
| ... | | | | | | | | | | | | |
| 61 | 0 | 1 | 0 | 1 | 0 | 1 | 0 | 1 | | 1 | 1 | 1 |
| 62 | 1 | 0 | 1 | 0 | 1 | 1 | 1 | 1 | | 1 | 1 | 1 |
| 63 | 0 | 0 | 0 | 1 | 0 | 1 | 0 | 1 | | 1 | 0 | 1 |

ROWS

FIG. 4C $$\begin{bmatrix} 112 & 48 & 64 & 0 \\ 176 & 240 & 128 & 192 \\ 96 & 32 & 80 & 16 \\ 160 & 224 & 144 & 208 \end{bmatrix}$$

FIG. 4D $$\begin{bmatrix} 0 & 128 & 32 & 160 & 8 & 136 & 40 & 168 \\ 192 & 64 & 224 & 96 & 200 & 72 & 232 & 104 \\ 48 & 176 & 16 & 144 & 56 & 184 & 24 & 152 \\ 240 & 112 & 208 & 80 & 248 & 120 & 216 & 88 \\ 12 & 140 & 44 & 172 & 4 & 132 & 36 & 164 \\ 204 & 76 & 236 & 108 & 196 & 68 & 228 & 100 \\ 60 & 188 & 28 & 156 & 52 & 180 & 20 & 148 \\ 252 & 124 & 220 & 92 & 244 & 116 & 212 & 84 \end{bmatrix}$$

DITHER THRESHOLD GENERATORS

BACKGROUND OF THE INVENTION

The present invention relates to the presentation of continuous-tone images on bi-level display media using ordered dither processing. In particular, the invention is directed to methods and arrangements for generating dither threshold values.

A bi-level display medium, such as a plasma panel, is comprised of a matrix of individual, closely spaced display cells each of which resides in one of two visual states. That is, each display cell is either completely energized (on) or completely de-energized (off). Picture images and other graphic data are readily displayed on a bi-level display medium via selective energization of its cells.

As indicated above, the present invention relates to the presentation of gray-scale, or continuous-tone, images on bi-level display media. Such images are characterized by regions of reflected or emitted light of various intensities. In reproducing the image on a particular display medium, the intensities of these various regions are mapped as closely as possible into correspondingly intense, or bright, regions of the display medium. The greater the intensity of a region of the image, the brighter the corresponding region of the display medium.

Unfortunately, an individual cell of a bi-level display medium can represent only one of two extreme intensities, corresponding to the on and off state of the cell. Thus unlike a cathode-ray tube, for example, a bi-level display medium cannot reproduce gray-scale information at each individual display cell location. However, it is known that the above-described mapping can be achieved in substantial measure by representing the average intensity of a region of the image by a region of the display medium having a corresponding average brightness.

One known method for achieving this average-intensity mapping is referred to as order dither processing. In a so-called "dithered display system", the image to be reproduced is scanned in a matrix of picture elements, each element corresponding to a respective cell of the display medium. The picture element matrix may be conceptualized as being divided into a plurality of $n$-by-$n$ submatrices, $n$ conventionally being an integer power of 2. Each picture element of each submatrix is assigned a spatially corresponding threshold value from a predetermined $n$-by-$n$ "dither matrix." As each picture element is scanned, its intensity, conventionally represented by a first multi-bit binary word, is quantized into one of a plurality of intensity levels between predetermined upper and lower quantization limits. At the same time, a dither threshold generator provides a "dither threshold word" representing the dither threshold value assigned to the picture element currently being scanned. If the intensity of a given picture element exceeds the dither threshold value assigned thereto, the corresponding display cell is energized. Otherwise, that cell is maintained de-energized.

Typical dither threshold generators comprise a look-up device, such as a read-only memory, which stores the dither matrix threshold values. As a particular picture element is scanned, the dither threshold value assigned thereto is read out of the memory for comparison to the intensity of that picture element. While such look-up arrangements are generally satisfactory, they are relatively expensive. Moreover, the delay inherent in the look-up process may undesirably limit the speed with which images can be scanned and dither processed.

SUMMARY OF THE INVENTION

The principal object of the present invention is to provide a dither threshold generator and generating method which avoid the above and other shortcomings of prior art arrangements and methods.

Circuitry embodying the principles of the invention illustratively includes a row binary counter and a column binary counter. The row counter is incremented for each scanned row of the picture element matrix. The column counter is incremented for each individual scanned picture element. In generating the threshold values of a dither matrix in accordance with the invention, the two highest-order dither threshold bits are generated exclusively in response to the least-significant row and column counter bits. More particularly, each of these two dither threshold bits is derived from a different one of (a) the least-significant row counter bit or its inverse, (b) the least-significant column counter bit or its inverse, and (c) the exclusive-OR or exclusive-NOR function of (a) and (b) above.

The dither threshold word representing the threshold values of an $n$-by-$n$ dither matrix ($n$ being an integer power of 2) has a minimum of $2\log_2 n$ bits. Thus representing the threshold values of 4-by-4 or larger dither matrices requires at least third and fourth dither threshold bits. These bits are generated in accordance with the invention exclusively in response to the second-least-significant row and column counter bits. More particularly, the third- and fourth-highest-order dither threshold bits are each derived from a different one of (d) the second-least-significant row counter bit or its inverse, (e) the second-least-significant column counter bit or its inverse, and (f) the exclusive-OR or exclusive-NOR function of (d) and (e) above. In generating 8-by-8 or larger dither matrices in accordance with the invention, the necessary fifth- and sixth-highest-order dither threshold bits are similarly generated exclusively in response to the third-least-significant row and column counter bits, and so forth for larger dither matrices.

Faithful gray-scale reproduction and good picture resolution require that numerically successive threshold values of a dither matrix be spatially separated from one another within the matrix. This criterion is at least minimally satisfied when the two highest-order dither threshold bits are each generated in accordance with the invention as described above. It is substantially satisfied when each of the first $2\log_2 n$ dither threshold bits is so generated. Moreover, this criterion is assured to be optimally satisfied by not only generating each of the $2\log_2 n$ highest-order bits in accordance with the principles of the invention, generally, but more particularly, by generating each odd-order dither threshold bit in response to an exclusive-OR or exclusive-NOR function, as described above.

BRIEF DESCRIPTION OF THE DRAWING

The invention may be clearly understood from a consideration of the following detailed description and accompanying drawing in which.

DETAILED DESCRIPTION

Figure 1:
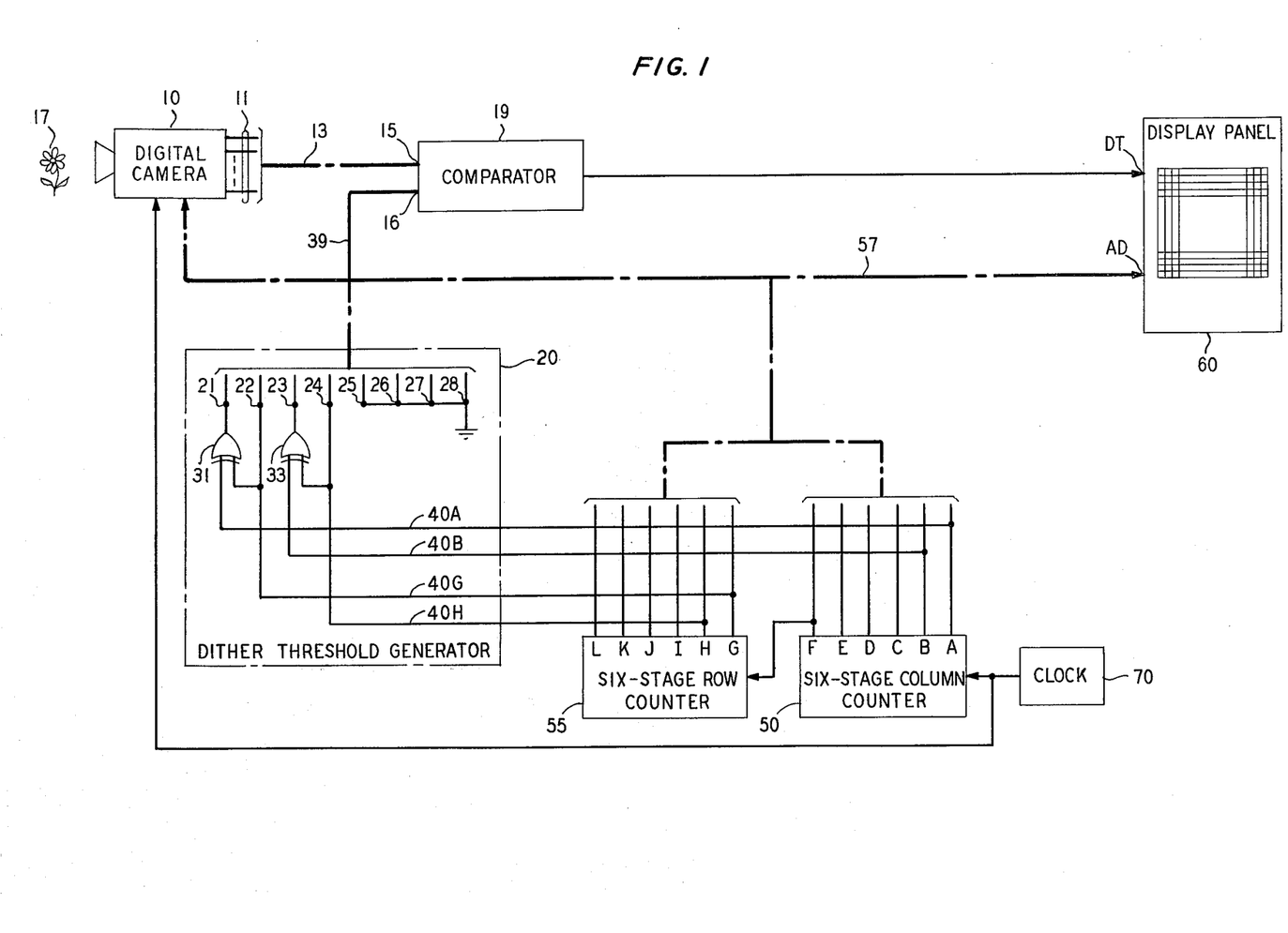
FIG. 1 is a block diagram of a dithered display system which includes a dither threshold generator embodying the principles of the invention.
Figure 2:
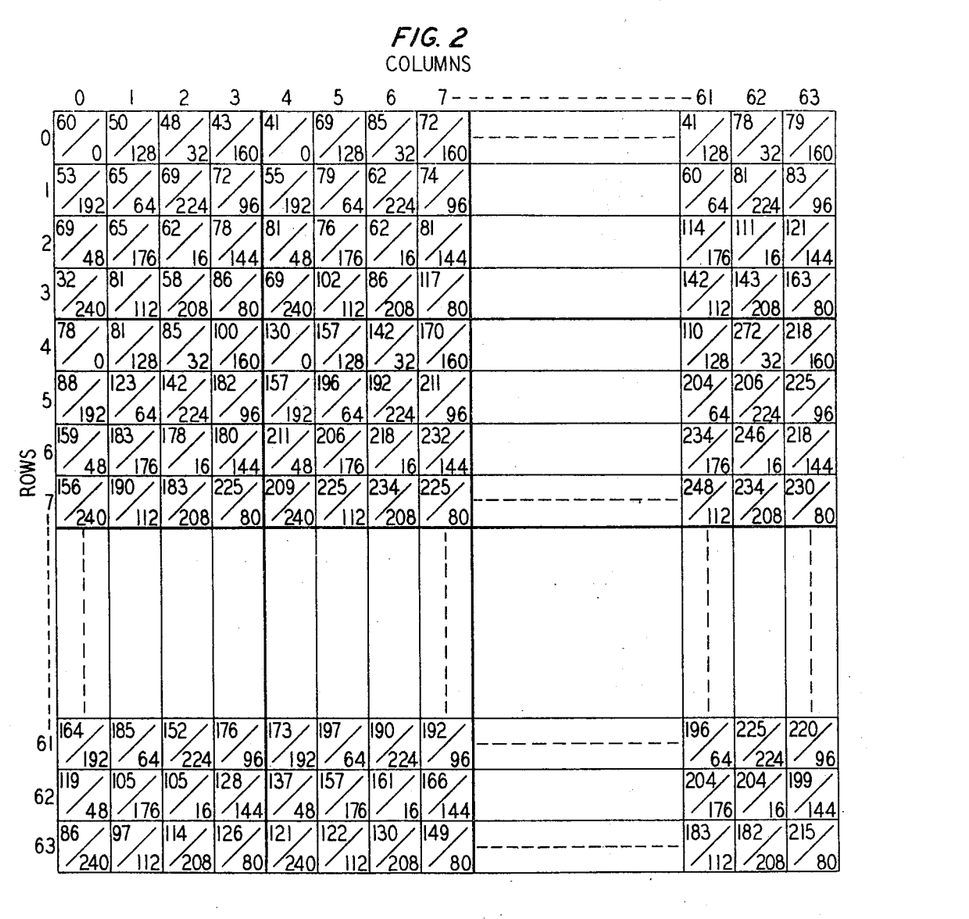
FIG. 2 is a chart which shows quantized picture element intensity values of an illustrative image scanned by the display system of FIG. 1, and which further shows illustrative dither threshold values assigned to those picture elements.

The display system of FIG. 1 includes digital camera 10, dither threshold generator 20, multibit comparator 19, six-stage column counter 50, six-stage row counter 55, bi-level display medium 60 and clock 70. Display medium 60 is illustratively an ac plasma panel and is comprised of a matrix of 4096 bi-level display cells. Camera 10 scans images to be presented on panel 60 in a matrix of 4096 picture elements, each corresponding to a different cell of the panel. As indicated in FIG. 2, the 64 rows and 64 columns of the picture element matrix are each numbered serially from 0 to 63. The intensity of each scanned picture element is quantized into one of (illustratively) 256 intensity levels between 0 and 255. A binary word representing that intensity level is provided on lead 11 and cable 13. Picture element intensities for an illustrative scanned image 17 are indicated by the upper number at each picture element location in FIG. 2.

The column and row location, or address, of picture elements to be scanned by camera 10 are extended thereto on cable 57 from counters 50 and 55, respectively. In particular, the bits at lowest— through highest-order (i.e., least— through most-significant) output terminals A through F of counter 50 indicate the column in which a particular picture element to be scanned is located; the bits at lowest— through highest-order output terminals G through L of counter 55 indicate the row in which that picture element is located.

Clock 70 generates a train of regularly spaced clock pulses, each of which increments column counter 50 by one count. Counter 50, in turn, increments counter 55 by one count for each 64 clock pulses. Each clock pulse also causes camera 10 to scan image 17 at the picture element location then indicated on cable 57. (Camera 10 may be, for example, the commercially available EMR Photoelectric Optical Data Digitizer). This arrangement causes camera 10 to serially scan picture elements 0-63 in row 0, then picture elements 0-63 in row 1 and so forth for the entire image.

Faithful reproduction of a gray-scale, or continuous-tone, image on a display medium involves mapping the intensities of various regions of the image as closely as possible into correspondingly intense, or bright, regions of the medium. The bi-level cells of display panel 60 can reside in only one or two states — either fully energized, or on, or fully de-energized, or off. Thus, unlike a full-gray-scale display medium such as a cathode-ray tube, display panel 60 is not capable of precisely representing the intensity of each scanned image picture element at the corresponding display cell location.

Advantageously, however, the display system of FIG. 1 achieves the above-described mapping in substantial measure by energizing selected cells of panel 60 such that the average intensities of regions of scanned image 17 are represented by regions of panel 60 having corresponding average brightness. The display system of FIG. 1 utilizes the known ordered dither processing technique to select appropriate cells for energization to achieve this end.

In particular, each picture element of the scanned image is assigned a dither threshold value in a manner described in detail hereinbelow. The dither threshold value assigned to each picture element is the lower number at each picture element location in FIG. 2. At the same time as the intensity of each scanned picture element is provided in binary form on cable 13, a dither threshold word representing the dither threshold value assigned to that picture element is provided by dither threshold generator 20 at output terminals 21–28 and cable 39. Cables 13 and 39 extend to input terminals 15 and 16, respectively, of comparator 19. Thus, if the intensity of a particular picture element is greater than its assigned dither threshold value, comparator 19 provides a first signal indication, such as a binary 1, to data terminal DT of display panel 60. This 1 indicates that the cell corresponding to the picture element currently being scanned is to be energized. The address of that cell is provided to address terminal AD of panel 60 from cable 57.

If, on the other hand, the intensity of a particular picture element is not greater than its assigned dither threshold value, comparator 19 provides a second signal indication, such as a binary 0, to terminal DT. This 0 indicates that the corresponding display cell is to be maintained de-energized.

Figure 3:
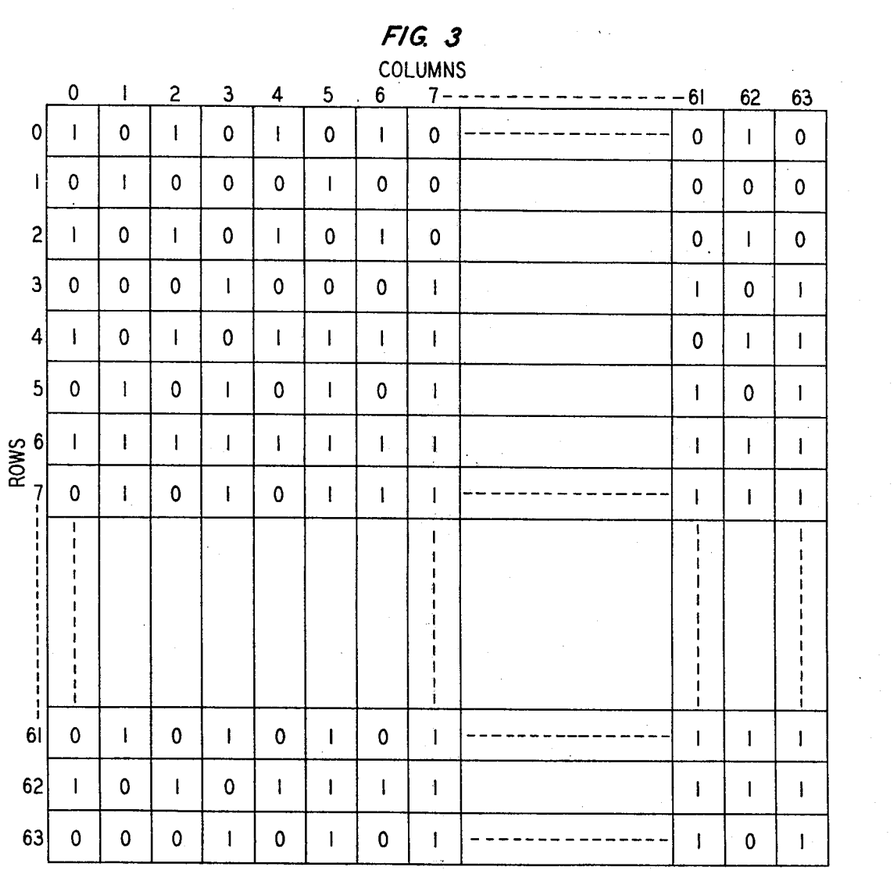
FIG. 3 is a chart which shows the dithered image display bit values corresponding to the above-mentioned scanned image.

FIG. 3 depicts the pattern of on and off cells generated when image 17 is dither processed in the manner described above. On and off cells are represented in FIG. 3 by display bits of value 1 and 0, respectively. When a large number of closely spaced bi-level display cells are selectively energized in accordance with a dithered image bit pattern such as that of FIG. 3, a gray-scale representation of the original scanned image is provided. See, for example, the dithered images in copending patent application, Ser. No. 560,505, filed Mar. 19, 1975 and also U.S. Pat. No. 3,925,609 issued to W. H. Ninke on Dec. 9, 1975.

In assigning dither threshold values to the picture elements of an image, the picture element matrix is divided into a plurality of square submatrices, as shown by the heavy lines in FIG. 2. Each submatrix illustratively comprises sixteen picture elements in 4-by-4 arrangement. The dither threshold value assigned to each picture element in each submatrix is a spatially corresponding threshold value from the predetermined 4-by-4 dither matrix.

$$\begin{bmatrix} 0 & 128 & 32 & 160 \\ 192 & 64 & 224 & 96 \\ 48 & 176 & 16 & 144 \\ 240 & 112 & 208 & 80 \end{bmatrix}$$

It should be noted, however, that both the size of the dither matrix used in the display system of FIG. 1 as well as the particular threshold values thereof, are merely illustrative. Advantageously, increasing the number of threshold values in a dither matrix (and correspondingly, of course, the size of each picture element submatrix) increases the number of different intensities which can be represented in the reproduced image. As the size of the dither matrix is increased, however, the distinction between the numerous intensities represented may become too subtle for the viewer to perceive. Factors to be taken into account in choosing the dither matrix size include the distance from which observers are expected to view the dithered image, the overall dimensions of the display medium, and the nature of the images to be presented.

Once an appropriate dither matrix size has been selected for the display application at hand, the threshold values themselves are chosen. It is conventional to choose the threshold values of a dither matrix such that they are distributed across substantially the entire quantization range (in the present application, the range 0–255), with numerically successive threshold values having a constant difference between them.

In addition, it is known that optimum gray-scale and picture resolution characteristics are achieved when numerically successive threshold values are spatially separated from one another within the matrix. In the above dither matrix, for example, the 0 is relatively distant from the 16, which is relatively distant from the 32 and so forth.

In known dithered display systems, the threshold values of the selected dither matrix are typically stored in a look-up device such as a read-only memory. As each picture element is scanned, the dither threshold value assigned thereto is read out of the memory for comparison to the intensity of that picture element, as previously described. Such an arrangement is shown, for example, in copending patent application Ser. No. 542,863, filed on Jan. 21, 1975 now U.S. Pat. No. 3,937,878 issued to C. N. Judice on Feb. 10, 1976. Disadvantageously, these look-up arrangements are relatively expensive. Moreover, the delay inherent in the look-up process may undesirably limit the speed with which images can be scanned and dither processed.

The present dither threshold generators avoid these and other shortcomings of prior art arrangements. In generating the threshold values of a dither matrix in accordance with the invention, the two highest-order dither threshold bits are generated exclusively in response to the least-significant bits of the row and column counters. In particular, each of these dither threshold bits is derived from a different one of (a) the least-significant bit of the row counter or its inverse, (b) the least-significant bit of the column counter or its inverse, and (c) the exclusive-OR or exclusive-NOR function of (a) and (b). Advantageously, the above-discussed spatial separation criterion is at least minimally satisfied by generating the two highest-order dither threshold bits in this manner — the other bits being generated in any desired manner.

The dither threshold word representing the threshold values of an $n$-by-$n$ dither matrix ($n$ being an integer power of 2) has a minimum of $2\log_2 n$ bits. Thus, for example, generating the threshold values of a 4-by-4 dither matrix, as in the illustrative embodiment, requires at least third and fourth dither threshold bits; generating the threshold values of an 8-by-8 dither matrix requires at least fifth and sixth dither threshold bits, and so forth.

In accordance with the invention, the third- and fourth-highest-order bits of the dither threshold word are generated exclusively in response to the second-least-significant row and column counter bits. More particularly, each of these dither threshold bits is derived from a different one of (d) the second-least-significant bit of the row counter or its inverse, (e) the second-least-significant bit of the column counter or its inverse, and (f) the exclusive-OR or exclusive-NOR function of (d) and (e). Fifth- and sixth-highest-order dither threshold bits, if required, may be derived from the third-least-significant row and column counter bits in an analogous manner.

Advantageously, the above-discussed spatial separation criterion is assured to be not only minimally, but substantially, satisfied by generating each of the $2\log_2 n$ highest-order dither threshold bits in accordance with the invention, as described above. It is assured to be optimally satisfied by not only generating each of the $2\log_2 n$ highest order bits in accordance with the principles of the invention generally, but more particularly, by generating each odd-order bit in response to an exclusive-OR or exclusive-NOR function as described above.

Dither threshold generator 20 is exemplary. The highest-order dither threshold bit at terminal 21 thereof is generated in accordance with (c) above by exclusive-OR gate 31. The latter receives the least-significant output bits of counters 50 and 55 on leads 40A and 40G, respectively. Gate 31 provides a 0 at terminal 21 when the bits on leads 40A and 40G are equal and a 1 when they are unequal. The second-highest-order dither threshold bit, at terminal 22, is illustratively generated in accordance with (a) above. Thus, lead 40G is also extended directly to terminal 22. The third-highest-order dither threshold bit, at terminal 23, is generated illustratively in accordance with (f) above by exclusive-OR gate 33, which receives the second-least-significant output bits of counters 50 and 55 on leads 40B and 40H, respectively. Gate 33 provides a 0 at terminal 23 when the bits on leads 40B and 40H are equal and a 1 when they are unequal. The fourth-highest-order dither threshold bit, at terminal 24, is illustratively generated in accordance with (d) above. Thus lead 40H is also extended directly to terminal 24.

The total number of bits in the output word of a dither threshold generator is typically the same as that required to express the upper quantization limit in binary form. In the illustrative embodiment, then, generator 20 provides an eight-bit word since the binary representation of 255 is 11111111. Conventionally, any bits after the $2\log_2 n$ bits of highest-order are typically the same for each threshold value. Here, $n = 4$ and thus $2\log_2 n = 4$. Accordingly, the signals at the four least-significant output terminals of generator 20, i.e., terminals 25–28, are all time invariant, and are illustratively tied to ground, i.e., binary 0.

In operation, assume that a pulse from clock 70 has just established register 50 in its 000000 state. Register 55 is thus also in its 000000 state. The column and row addresses on cable 57 are both 000000 and camera 10 scans the picture element in row 0, column 0 of image 17. At this time, the dither threshold value on cable 39 is 00000000. The dither threshold value 0 is thus provided for comparison to the intensity of this first scanned picture element.

The next three clock pulses increment the count in register 50 to 000001, 000010, and then 000011, so that the picture elements in columns 1, 2 and 3 of row 0 are scanned in turn. The dither threshold value on cable 39 changes to 10000000, 00100000, and then 10100000. Reference to FIG. 2 will verify that the dither threshold values assigned to the first four picture elements of row 0 are in fact the decimal equivalents of these threshold values, viz, decimal 0, 128, 32, 160. The same four element cycle repeats for the remaining 60 picture elements of row 0. The bits at terminals A and B, it will be recognized, indicate the column position, or coordinate, i.e., zeroth, first, second or third column, of each picture element within its own submatrix.

The clock pulse following the scanning of the picture element at row 0, column 63 returns the count in register 50 to 000000. The count in register 55 is now 000001 and scanning of row 1 begins. The dither threshold value on cable 39 is now 11000000, i.e., decimal 192. As the next three picture elements of row 1 are scanned, the count in register 50 is incremented to 000001, 000010, and then 000011. The count in register 55 remains at 000001. The three corresponding dither threshold values on cable 39 are 01000000, 11100000, and 01100000, i.e., decimal 64, 224 and 96, as can be verified by reference to FIG. 2. The same four element cycle repeats for the remaining 60 picture elements of row 1.

The dither threshold values assigned to the picture elements of rows 2 and 3 are generated similarly. The same four-row cycle then repeats for the remaining 60 rows of the image. The bits at terminals G and H, it will be recognized, indicate the row position, or coordinate, i.e., zeroth, first, second or third row, of each picture element within its own submatrix.

Figure 4A:
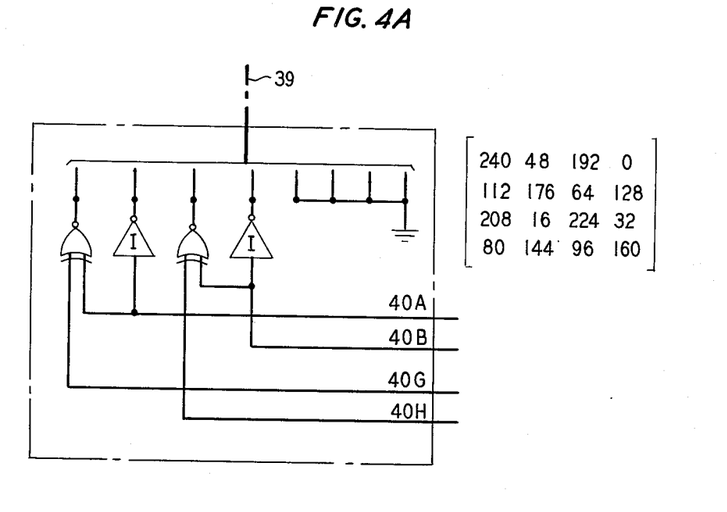
FIGS. 4A–4D show a number of alternative dither threshold generators embodying the principles of the invention, and the dither matrices generated thereby.
Figure 4B:
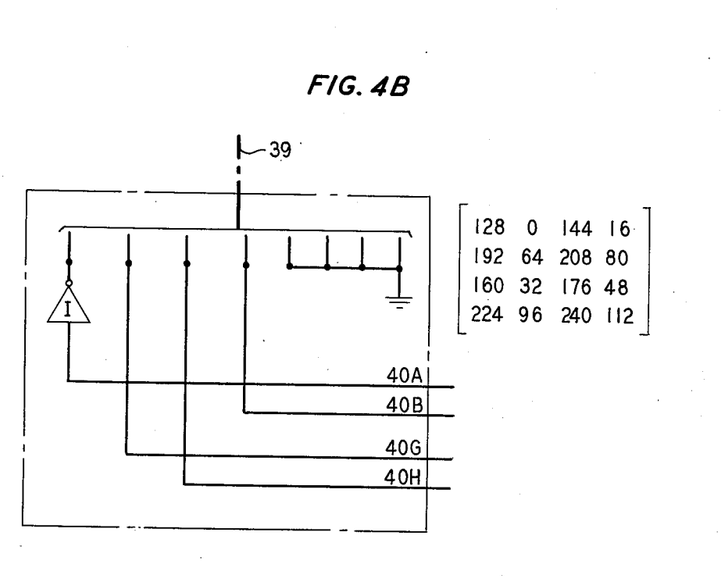
Figure 4C:
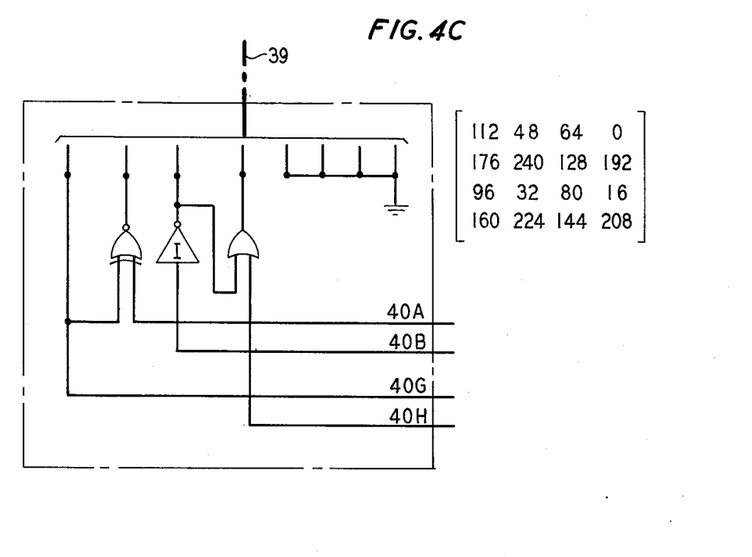

It will be appreciated from the disclosure hereinabove that the present invention encompasses a family of dither threshold generators in which any of several alternative circuit arrangements can be used to generate each dither threshold bit. Three illustrative such dither threshold generators, which, if desired, can be individually substituted for generator 20 in the display system of FIG. 1, are shown in FIGS. 4A–4C, along with the dither matrices generated thereby. Many of the dither matrices generated by the present dither threshold generators comprise flipped, rotated and/or mirrored versions of each other. For example, the respective matrices provided by dither threshold generator 20 in FIG. 1 and the generator of FIG. 4A are rotated versions of each other. The matrices provided by the dither threshold generators of FIGS. 4B and 4C are not directly related to that provided by generator 20, but nonetheless, substantially satisfy the above-discussed spatial separation criterion.

Figure 4D:
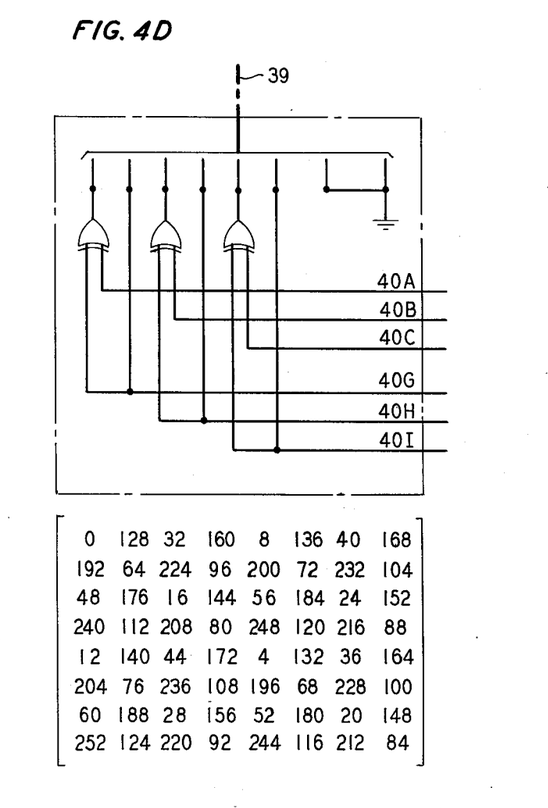

FIG. 4D shows an illustrative dither threshold generator which provides the threshold values of an 8-by-8 dither matrix in accordance with the invention. The dither matrix generated thereby is also shown. The generator of FIG. 4D includes additional signal leads 40C and 40I, which extend from the third-least-significant bits of counters 50 and 55, respectively.

Although specific dither threshold generators have been shown and described herein, these are merely illustrative of the broad principles of the invention. Thus it will be appreciated that many and varied arrangements in accordance with those principles may be devised by those skilled in the art without departing from the spirit and scope of the invention.

What is claimed is:

1. A dither threshold generator for use in a system for dither processing a matrix of scanned image picture elements, said generator comprising means for providing a pair of binary numbers respectively indicative of first and second coordinate positions of a selected one of said picture elements within a selected submatrix of said picture element matrix, first means for generating first and second bi-level dither threshold bits exclusively in response to the least-significant bits of said binary numbers, and second means for generating third and fourth bi-level dither threshold bits exclusively in response to the second-least-significant bits of said binary numbers.

2. The invention of claim 1 wherein said system further includes means for receiving a first binary word representing the intensity of said selected one of said picture elements, said first binary word comprising at least first through fourth bi-level bits, means for receiving a second binary word comprising at least said first through fourth dither threshold bits, and means operative for indicating when a predetermined one of said words is larger than the other.

3. The invention of claim 2 further comprising a matrix of selectively energizable display cells each corresponding to a different one of said picture elements and means for energizing the one of said display cells corresponding to said selected one of said picture elements in response to the operation of said indicating means.

4. The invention of claim 1 wherein said first generating means includes first circuit means for determining the level of said first dither threshold bit in response to the least-significant bit of said first binary number and second circuit means for determining the level of said second dither threshold bit in response to the least-significant bit of at least said second binary number.

5. The invention of claim 4 wherein said second circuit means comprises means for providing said second dither threshold bit with a first level when the least-significant bits of said binary numbers are equal, and with a second level when they are unequal.

6. The invention of claim 5 wherein said second generating means includes third circuit means for determining the level of said third dither threshold bit in response to the second-least-significant bit of one of said binary numbers and fourth circuit means for determining the level of said fourth dither threshold bit in response to the second-least-significant bit of at least the other of said binary numbers.

7. The invention of claim 6 wherein said fourth circuit means comprises means for providing said fourth dither threshold bit with one of said first and second levels when the second-least-significant bits of said binary numbers are equal, and with the other of said first and second levels when they are unequal.

8. A dither threshold generator for use in a system for dither processing a plurality of scanned image picture elements arranged in a plurality of picture element submatrices, said dither threshold generator comprising means for providing first and second binary numbers indicative of first and second coordinate positions, respectively, of a selected picture element in each of said submatrices, and means for generating a multibit binary word representing the value of a dither threshold assigned to said selected picture element, said generating means including means for providing as the highest- and second-highest-order bits of said word different ones of (a) the least-significant bit of said first binary number or its inverse, (b) the least-significant bit of said second binary number or its inverse, and (c) the exclusive-OR or exclusive-NOR function of (a) and (b).

9. The invention of claim 8 wherein said generating means further includes means for providing as third- and fourth-highest-order bits of said word different ones of (d) the second-least-significant bit of said first binary number or its inverse, (e) the second-least-significant bit of said second binary number or its inverse, and (f) the exclusive-OR or exclusive-NOR function of (d) and (e).

10. A system for dither processing a plurality of scanned image picture elements comprising means for receiving a succession of picture element signals each corresponding to a different one of said picture elements, means for generating first and second binary counts, means for incrementing said first count after each one of said picture element signals is received, means for incrementing said second count after each of predetermined ones of said picture elements is received, and means operative as the signal corresponding to each said picture element is received for providing a first multibit binary word representing a dither threshold value assigned to that picture element, said providing means characterized by first means for generating the highest- and second-highest-order bits of said word exclusively in response to the least-significant bits of said first and second counts, and second means for generating third- and fourth-highest-order bits of said word exclusively in response to the second-least-significant bits of said first and second counts.

11. The invention of claim 10 wherein said picture elements are arranged in a plurality of rows of said scanned image, wherein each of said predetermined ones of said picture elements comprises a preselected picture element from a different one of said rows, and wherein each of said picture element signals comprises a second multibit binary word representing the intensity of the picture element corresponding thereto, said system further comprising means responsive to said first and second binary words for generating a predetermined indication for each picture element which has an intensity exceeding its assigned dither threshold value.

12. The invention of claim 11 wherein said first means includes means for providing said highest-order bit at a first level when said least-significant bits are equal and at a second level when they are unequal, and means for determining the level of said second-highest-order bit in response to the value of a selected one of said least-significant bits and wherein said second means includes means for providing said third-highest-order bit at one of said first and second levels when said second-least-significant bits are equal and at the other of said first and second levels when they are unequal, and means for determining the level of said fourth-highest-order bit in response to the value of a selected one of said second-least-significant bits.

13. A dither threshold generating method for use in a system for dither processing a matrix of scanned image picture elements, said method comprising the steps of providing a pair of binary numbers respectively indicative of first and second coordinate positions of a selected one of said picture elements within a selected submatrix of said picture element matrix, generating first and second bi-level dither threshold bits exclusively in response to the least-significant bits of said binary numbers, and generating third and fourth bi-level dither threshold bits exclusively in response to the second-least-significant bits of said binary numbers.

14. The invention of claim 13 comprising the further steps of receiving a first binary word representing the intensity of said selected one of said picture elements, said first binary word comprising at least first through fourth bi-level bits, receiving a second binary word comprising at least said first through fourth dither threshold bits, and providing an indication when a predetermined one of said words is larger than the other.

15. The invention of claim 14 wherein said system includes a matrix of selectively energizable bi-level display cells each corresponding to a different one of said picture elements and wherein said method includes the further step of energizing the one of said display cells corresponding to said selected one of said picture elements in response to said indication.

16. The invention of claim 13 wherein the first of said generating steps includes the steps of determining the level of said first dither threshold bit in response to the least-significant bit of said first binary number and determining the level of said second dither threshold bit in response to the least-significant bit of at least said second binary number.

17. The invention of claim 16 wherein the second of said determining steps comprises the steps of providing said second dither threshold bit with a first level when the least-significant bits of said binary numbers are equal, and with a second level when they are unequal.

18. The invention of claim 17 wherein the second of said generating steps includes the steps of determining the level of said third dither threshold bit in response to the second-least-significant bit of one of said binary numbers and determining the level of said fourth dither threshold bit in response to the second-least-significant bit of at least the other of said binary numbers.

19. The invention of claim 18 wherein the last of said determining steps comprises the step of providing said fourth dither threshold bit with one of said first and second levels when the second-least-significant bits of said binary numbers are equal, and with the other of said first and second levels when they are unequal.

20. A dither threshold generating method for use in a system for dither processing a plurality of scanned image picture elements arranged in a plurality of picture element submatrices, said method comprising the steps of:

providing first and second binary numbers indicative of first and second coordinate positions, respectively, of a selected picture element in each of said submatrices, and generating a multibit binary word representing the value of a dither threshold assigned to said selected picture element, said generating step including the step of providing as the highest- and second-highest-order bits of said word different ones of (a) the least-significant bit of said first binary number or its inverse, (b) the least-significant bit of said second binary number or its inverse, and (c) the exclusive-OR or exclusive-NOR function of (a) and (b).

21. The invention of claim 20 wherein said generating step includes the further step of providing as third- and fourth-highest-order bits of said word different ones of (d) the second-least-significant bit of said first binary number or its inverse, (e) the second-least-significant bit of said second binary number or its inverse, and (f) the exclusive-OR or exclusive-NOR function of (d) and (e).

22. A method for dither processing a plurality of scanned image picture elements, said method comprising the steps of receiving a succession of picture element signals each corresponding to a different one of said picture elements, generating first and second binary counts, incrementing said first count after each one of said picture element signals is received, incrementing said second count after each of predetermined ones of said picture elements is received, and providing a first multibit binary word as the signal corresponding to each said picture element is received, said word representing a dither threshold value assigned to that picture element, said providing step characterized by the steps of generating the highest- and second-highest-order bits of said word exclusively in response to the least-significant bits of said first and second counts, and generating third- and fourth-highest-order bits of said word exclusively in response to the second-least significant bits of said first and second counts.

23. The invention of claim 22 wherein said picture elements are arranged in a plurality of rows of said scanned image, wherein each of said predetermined ones of said picture elements comprises a preselected picture element from a different one of said rows, and wherein each of said picture element signals comprises a second binary word representing the intensity of the picture element corresponding thereto, said method including the further step of generating a predetermined indication in response to said first and second binary words for each picture element which has an intensity exceeding its assigned dither threshold value.

24. The system of claim 23 wherein the first of said bit generating steps includes the steps of providing said highest-order bit at a first level when said least-significant bits are equal and at a second level when they are unequal, and determining the level of said second-highest-order bit in response to the value of a selected one of said least-significant bits and wherein the second of said bit generating steps includes the steps of providing said third-highest-order bit at one of said first and second levels when said second-least-significant bits are equal and at the other of said first and second levels when they are unequal, and determining the level of said fourth-highest-order bit in response to the value of a selected one of said second-least-significant bits.

* * * * *